United States Patent
Garritsen

(10) Patent No.: US 8,031,194 B2
(45) Date of Patent: Oct. 4, 2011

(54) INTELLIGENT CONFIGURABLE GRAPHICS BANDWIDTH MODULATOR

(75) Inventor: Frido Garritsen, Hayward, CA (US)

(73) Assignee: Vivante Corporation, Sunnyvale, CA (US)

(*) Notice: Subject to any disclaimer, the term of this patent is extended or adjusted under 35 U.S.C. 154(b) by 966 days.

(21) Appl. No.: 11/938,214

(22) Filed: Nov. 9, 2007

(65) Prior Publication Data

US 2009/0122068 A1    May 14, 2009

(51) Int. Cl.
  G06T 15/00   (2011.01)
  G06T 15/50   (2011.01)
  G06T 15/10   (2011.01)
  G06T 1/20    (2006.01)
(52) U.S. Cl. ......... 345/427; 345/419; 345/426; 345/506
(58) Field of Classification Search .......... 345/419, 345/426, 427, 506
  See application file for complete search history.

(56) References Cited

U.S. PATENT DOCUMENTS

| | | |
|---|---|---|
| 5,852,443 A | 12/1998 | Kenworthy |
| 5,864,642 A | 1/1999 | Chun |
| 5,886,701 A | 3/1999 | Chauvin |
| 6,326,964 B1 | 12/2001 | Snyder |
| 6,344,852 B1 | 2/2002 | Zhu |
| 6,697,063 B1 | 2/2004 | Zhu |
| 6,747,658 B2 | 6/2004 | Doyle |
| 6,771,269 B1* | 8/2004 | Radecki et al. ............... 345/503 |
| 6,798,421 B2 | 9/2004 | Baldwin |
| 6,828,978 B2 | 12/2004 | Buehler |
| 6,856,320 B1 | 2/2005 | Rubenstein |
| 7,102,646 B1 | 9/2006 | Rubinstein |
| 7,170,515 B1 | 1/2007 | Zhu |
| 2003/0043171 A1* | 3/2003 | Fliflet ......................... 345/622 |
| 2003/0160798 A1 | 8/2003 | Buehler |
| 2007/0146378 A1 | 6/2007 | Sorgard |

* cited by examiner

*Primary Examiner* — Hau Nguyen

(74) *Attorney, Agent, or Firm* — Stevens Law Group; David R. Stevens

(57) ABSTRACT

An apparatus and method to dynamically regulate system bandwidth in a graphics system includes receiving vertex data from an application by way of an application programming interface. The rate that the vertex data is received from the application is then determined. In the event the rate is greater than a selected threshold, the graphics system is configured to operate in immediate mode, wherein vertex data is rendered immediately upon reception. In the event the rate is less than the selected threshold, the graphics system is configured to operate in retained mode, wherein vertex data is stored prior to being rendered. The apparatus and method switches between each of the modes on-the-fly in a manner that is transparent to the application.

25 Claims, 8 Drawing Sheets

INTELLIGENT CONFIGURABLE GRAPHICS BANDWIDTH MODULATOR

BACKGROUND

This invention relates to three-dimensional graphics systems and more particularly to apparatus and methods for reducing system bandwidth requirements of three-dimensional graphics systems.

Three-dimensional (3D) computer graphics refer to graphics systems that generate two-dimensional (2D) images from 3D geometric models. These 2D images may then be displayed on computer screens or other raster-based devices. Currently, complex 3D graphics are used in applications such as computer games and are typically reserved for PC or entertainment-based platforms. Such 3D graphics may be unable to run on mobile devices (e.g., cell phones, PDAs, navigation systems) due to hardware limitations such as memory, memory bandwidth, and processing limitations. Memory bandwidth in particular is a major contributor to overall system power in mobile devices. Power consumption is one of the most if not the most significant limitation in the design of many mobile devices.

In general, there are two techniques for rendering a scene containing 3D objects: immediate mode and retained mode. Immediate mode is the most commonly used mode and is what most modem APIs and high-performance GPUs implement. In this mode, a state or primitive is rendered when it is passed from an application to a graphics driver. This architecture typically supports very high throughput, but its main disadvantage is that is uses significant memory bandwidth. This is because every pixel is read or written several times to the frame and depth buffers. Because the frame and depth buffers store information associated with every pixel of a display, they are typically implemented in external graphics memory outside the GPU. Access to this external memory increases system power requirements significantly.

Retained node is a rendering mode where all or a significant portion of the data for a scene is stored before it is rendered. This allows software to perform many different operations on the data prior to rendering it. For example, software could sort all of the vertices of a scene from back to front, eliminating the need for a depth buffer. In general, retained mode imaging provides a higher level of abstraction than immediate mode imaging and may be more amenable to hardware acceleration and caching. This feature may also reduce the amount of work a programmer needs to perform loading, managing, culling, and rendering data and allows a programmer to focus on higher application level functions. Nevertheless, retained mode imaging may also slow performance considerably due to the need to gather, save, and sort data from a scene prior to rendering it.

In view of the foregoing, what is needed is an apparatus and method to provide many of the advantages of retained mode and immediate mode architectures while avoiding many of the disadvantages of each. Further needed is an apparatus and method to dynamically and seamlessly switch between retained and immediate modes of operation in a way that is transparent to an application. Further needed are apparatus and methods to reduce graphics system bandwidth and reduce power consumption when performing 3D rendering.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through use of the accompanying drawings, in which.

DETAILED DESCRIPTION

Figure 1:
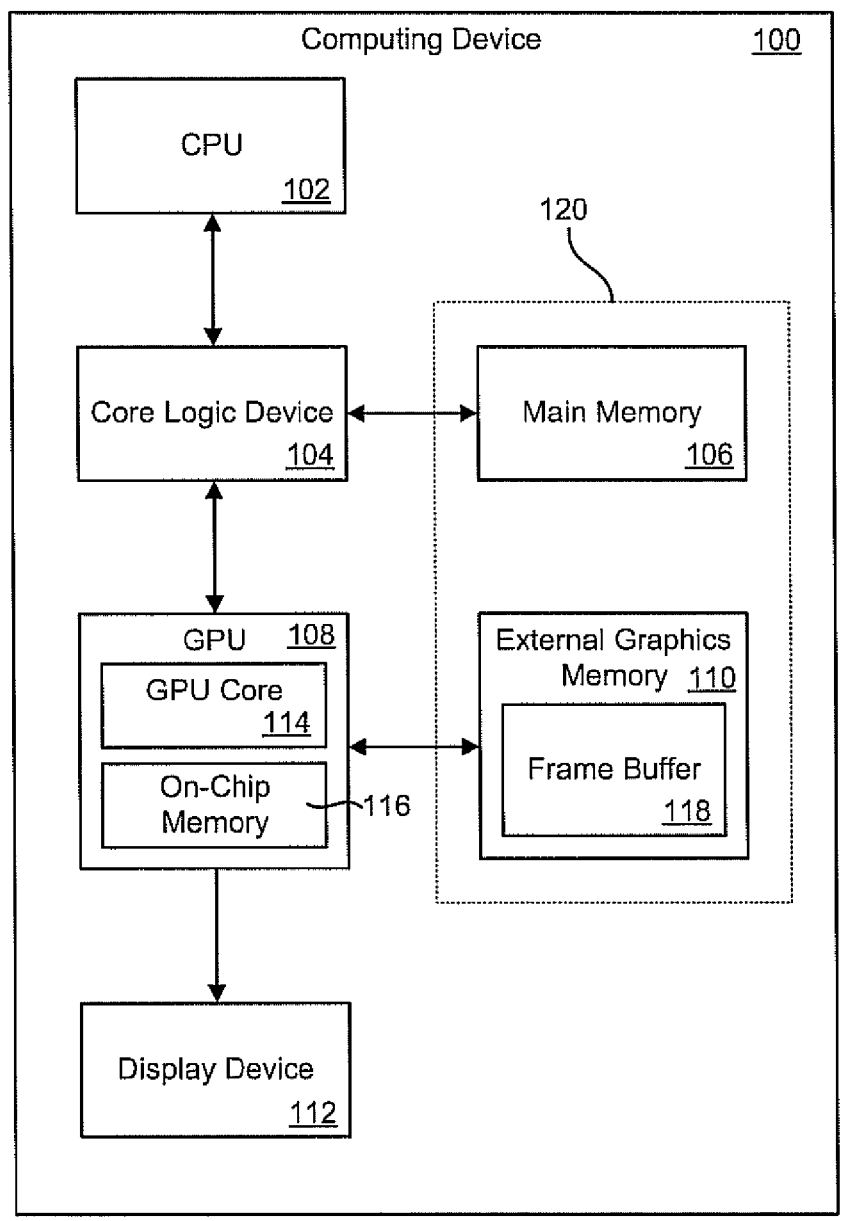
FIG. 1 is a high-level block diagram showing one example of a computing device for implementing an intelligent configurable bandwidth modulator in accordance with the invention.

The invention has been developed in response to the present state of the art, and in particular, in response to the problems and needs in the art that have not yet been fully solved by currently available apparatus and methods. Accordingly, the invention has been developed to provide a novel apparatus and method for reducing graphics system bandwidth. The features and advantages of the invention will become more fully apparent from the following description and appended claims and their equivalents, and also any subsequent claims or amendments presented, or may be learned by practice of the invention as set forth hereinafter.

Consistent with the foregoing, a method to dynamically regulate system bandwidth in a graphics system is disclosed in a first example of the invention as including receiving vertex data from an application by way of an application programming interface. The rate that the vertex data is received from the application is then determined. In the event the rate is greater than a selected threshold, the graphics system is configured to operate in immediate mode, wherein vertex data is rendered immediately upon reception. In the event the rate is less than the selected threshold, the graphics system is configured to operate in retained mode, wherein vertex data is stored prior to being rendered. The method may switch between each of the modes on-the-fly in a manner that is transparent to the application.

In selected examples, the method may include assembling the vertex data to generate primitives and calculating a bounding box for each of the primitives when operating in retained mode. This vertex data may, in selected examples, be stored in a buffer. Similarly, the primitives and associated bounding boxes may be stored in a separate buffer. In certain examples, the method may also include calculating a batch bounding box for each batch of primitives that has the same render state. These batches and associated bounding boxes may also be stored in a buffer.

When operating in retained mode, the method may include dividing a frame buffer into subdivisions, or windows, and determining which primitives are associated with each subdivision. This may be accomplished by determining which primitive and batch bounding boxes overlap with each subdivision. Each subdivision may then be rendered individually using on-chip memory local to the GPU. In selected examples, the method may include optimizing the size and position of subdivisions to efficiently utilize the on-chip memory. In selected examples, the size and position of subdivisions may be optimized to encompass entire batches of primitives.

In another example of the invention, a graphics system to dynamically regulate system bandwidth may include a graphics driver capable of receiving commands and vertex data from an application by way of an application programming interface. A graphics processing unit (GPU) may communicate with the graphics driver. The GPU and graphics driver together may be configured to operate in either immediate mode, wherein vertex data is rendered immediately upon being passed to the graphics driver, or retained mode, wherein vertex data is stored prior to being rendered. A switching module may be provided to dynamically switch between immediate mode and retained mode in a manner that is transparent to the application. The switching module may be configured to switch between these modes according to the rate at which vertex data is received from the application.

In another example of the invention, an apparatus to dynamically regulate system bandwidth in a graphics system may include means for receiving vertex data from an application by way of an application programming interface and means for determining the rate at which vertex data is received from the application. The apparatus may further include means for operating in immediate mode, wherein vertex data is rendered immediately upon reception, in the event the rate is greater than a selected threshold. The apparatus may also include means for operating in retained mode, wherein vertex data is stored prior to being rendered, in the event the rate is less than the selected threshold.

It will be readily understood that the components of the invention, as generally described and illustrated in the Figures herein, may be arranged and designed in a wide variety of different configurations. Thus, the following more detailed description of the examples of the system, apparatus and methods of the invention, as represented in the Figures, is not intended to limit the scope of the invention, as claimed, but is merely representative of selected examples of systems, devices and methods that embody or otherwise incorporate the invention.

Some of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one example," "an example," or similar language means that a particular feature, structure, or characteristic described in connection with the example may be included in at least one example of the invention. Thus, appearances of the phrases "in one example" or "in an example" in various places throughout this specification are not necessarily all referring to the same example.

Furthermore, the described features, structures, or characteristics may be combined in any suitable manner in one or more examples. In the following description, specific details may be provided, such as examples of programming, software modules, user selections, or the like, to provide a thorough understanding of examples of the invention. One skilled in the relevant art will recognize, however, that the invention can be practiced without one or more of the specific details, or with other methods or components. In other instances, well-known structures, or operations are not shown or described in detail to avoid obscuring aspects of the invention.

The illustrated examples of the invention will be best understood by reference to the drawings, wherein like parts are designated by like numerals throughout. The following description is intended only by way of example, and simply illustrates certain selected examples of apparatus and methods that are consistent with the invention as claimed herein.

Referring to FIG. 1, one example of a computing device 100 for implementing an intelligent configurable graphics bandwidth modulator in accordance with the invention is illustrated. In selected examples, the computing device 100 is a mobile device such as a mobile phone, personal digital assistant (PDA), portable media player, handheld game console, navigation system, information appliance, or the like where system power consumption is a major limitation. Nevertheless, the bandwidth modulator described herein may be used with a host of different computing devices 100, including fixed or non-portable systems, embedded or general-purpose systems, to reduce graphics system bandwidth and power consumption.

As shown, one example of a computing device 100 may include a central processing unit (CPU) 102, a core logic device 104 (e.g., memory controller, video controller, etc.) and main memory 106. The graphics system of the computing device 100 may include a graphics processing unit (GPU) 108, external graphics memory 110, and a display device 112 such as an LCD, CRT display, plasma display, or other type of display 112. In selected examples, the components illustrated in FIG. 1 may be discrete components or integrated onto single chips or circuits. For example, a memory controller (e.g., core logic device 104) may be integrated onto the same chip as the CPU 102 or main memory 106. In other examples, the external graphics memory 106 and the main memory 106 may be the same memory device 120. The computing device 100 as illustrated is simply provided by way of example and is not intended to be limiting.

In selected examples, the GPU 108 may include a GPU core 114 as well as on-chip memory 116. The external graphics memory 110 may include a frame buffer 118 to store a complete frame of video data for output to the display device 112.

Figure 2:
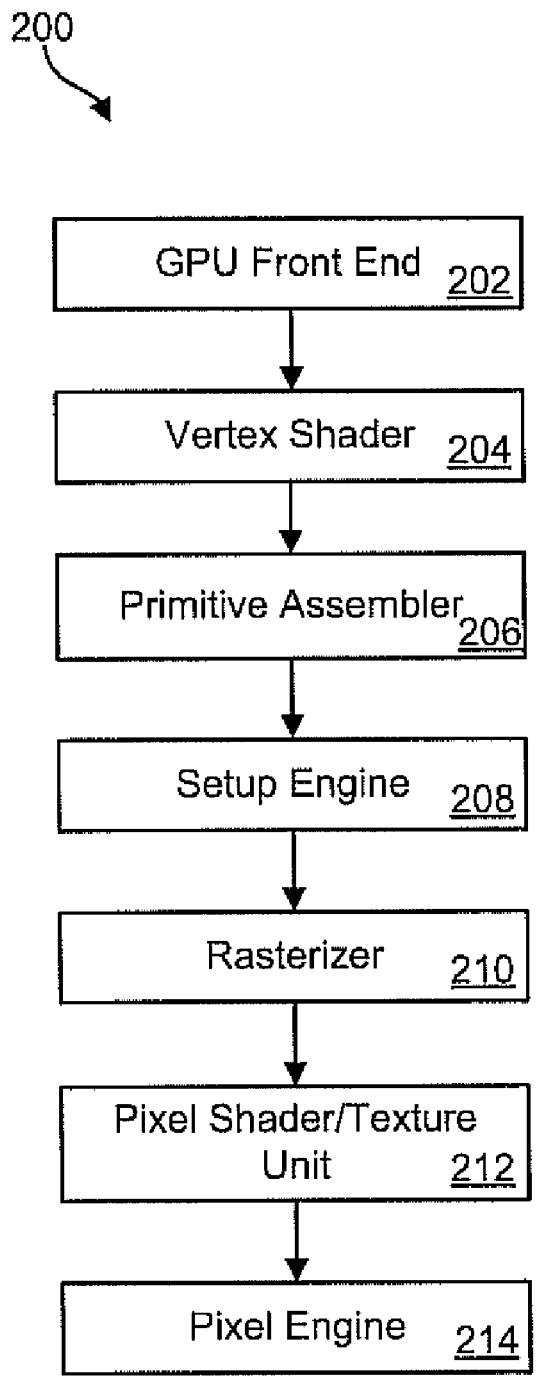
FIG. 2 is a flow chart illustrating one example of a conventional 3D graphics pipeline.

Referring to FIG. 2, in selected examples, a GPU 108 may implement a modified and improved version of a conventional 3D graphics pipeline 200 to achieve the objectives of the present invention. The following description provides a very brief explanation of the function of one example of a graphics pipeline 200 and is not intended to be limiting. As shown, a conventional 3D graphics pipeline 200 may include a GPU front end 202 to act as a command parser for the GPU 108 and perform tasks such as fetching vertices for transmission through the pipeline 200. A vertex shader 204 may perform mathematical operations on the vertex data such as transforming vertices or changing the color, texture, or lighting on the vertices. A primitive assembler 206 may receive the vertices from the vertex shader 204 and assemble them to create triangles or other primitive shapes.

In selected examples, the pipeline 200 may include a setup engine 208 to perform selected mathematical operations needed to render 3D images and reduce the workload of a CPU. A rasterizer 210 may work closely with the setup engine 208 to perform tasks such as computing primitive bounding boxes, computing edge equations and edge slopes, and converting primitives to pixels. A pixel shader/texture unit 212 may be provided to manipulate the pixels generated by the rasterizer 210 on a pixel-by-pixel basis to apply effects such as water or metal effects as well as apply textures to each of the pixels. Finally, a pixel engine 214 may perform operations such as depth comparisons, stenciling for shadow effects, and alpha-blending on pixel color. The pixel engine 214 may function as a cache controller with a large cache to reduce system bandwidth.

The 3D graphics pipeline 200 and components thereof, as illustrated in FIG. 2, provide the basis of the improved pipeline illustrated in FIG. 3 through 11. Nevertheless, the graphics pipeline 200 illustrated in FIG. 2 is simply one example of a 3D graphics pipeline that may be used with the present invention and is not intended to be limiting. That is, apparatus and methods in accordance with the invention may be used with different pipeline models (other than that illustrated) which use different steps, ordering of steps, techniques, processes, APIs, or the like to render 3D graphics. Thus, the invention may utilize different pipeline models, as appropriate, and is not limited to the illustrated model.

Figure 3:
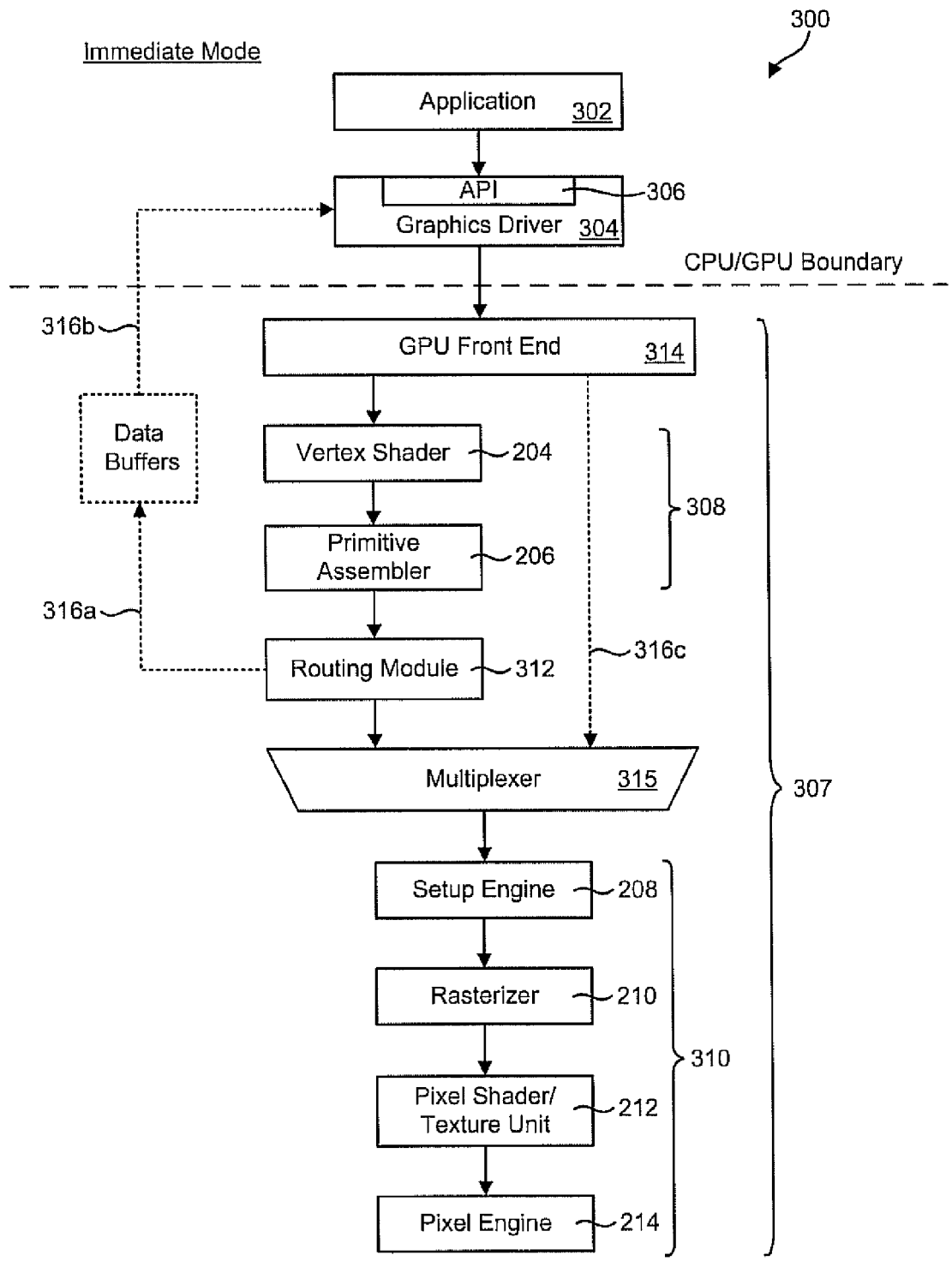
FIG. 3 is a flow chart showing the interaction between an application, graphics driver, and modified graphics pipeline in accordance with the invention, when operating in immediate mode.

Referring to FIG. 3, in selected examples, a graphics system 300 in accordance with the invention may dynamically switch between retained and immediate modes of operation to take advantage of the benefits of each. For the purposes of this specification, the phrase "retained mode," instead of referring to an API, is used generally to refer to any 3D graphics technique where all or a significant portion of the graphics data for a scene is stored after it is passed to the graphics driver but before it is rendered to the display. This allows various operations to be performed on the graphics data prior to rendering it. Similarly, the phrase "immediate mode," instead of referring to an API, is used generally to refer to any 3D graphics technique where graphical objects are rendered when they are passed to the graphics driver, without storing all or a large portion of the graphics data for a scene prior to rendering. Thus, the phrases "retained mode" and "immediate mode" refer to all techniques regardless of the names or designations given to the techniques that operate in the above-described manner or in a manner similar thereto.

As shown, in selected examples, a graphics system 300 in accordance with the invention may include an application 302 for producing graphics data (hereinafter referred to as vertex data) representing graphical objects (e.g., triangles) or other graphical representations. The vertex data may be passed to a graphics driver 304 by way of an application programming interface 306. The graphics driver 304 may then pass this vertex data to a GPU 108, implementing a pipeline 307, which has been specially configured to provide the benefits of the invention.

As shown, a GPU 108 in accordance with the invention may implement a modified pipeline 307 that is divided into two separate passes: a geometry pass 308 and a rendering pass 310. In general, the geometry pass 308 may be used to convert all or many of the vertices received from the graphics driver 304 to triangles (or other primitives). The rendering pass 310, on the other hand, may receive the triangles from the geometry pass 308 and convert them to pixels for display on a computing device 100. A routing module 312 in accordance with the invention may be inserted between the geometry pass 308 and the rendering pass 310 to route primitives in one of several directions, depending on the mode of operation. The dotted lines 316a-c, as shown in FIG. 3, represent data paths that may exist but not be utilized by the GPU 108 when operating in immediate mode.

When operating in immediate mode, the graphics driver 304 may pass vertex data and associated commands to a GPU front end 314 in order to send the vertices down the pipeline 307. A vertex shader 204 may transform the vertices or perform tasks such as modifying the color, texture, or lighting on the vertices. A primitive assembler 206 may assemble the vertices received from the vertex shader 204 to create triangles or other primitives. In immediate mode, the routing module 312 may be configured to route the triangles directly to the rendering pass 310. This may be accomplished by routing the primitives to a multiplexer 315, which may communicate with the routing module 312 and the GPU front end 314.

Once the primitives are transmitted to the multiplexer 315, the primitives may be transmitted to the setup engine 208 where they may be rendered in the conventional manner. That is, a rasterizer 210 may, among other tasks, compute the bounding box of primitives, edge equations and edge slopes of primitives, and convert the primitives to pixels. A pixel shader/texture unit 212 may manipulate the pixels on a pixel-by-pixel basis to apply effects and textures to each of the pixels. A pixel engine 214 may perform operations such as depth comparisons, stenciling for shadow effects, and alpha-blending on pixel color.

Figure 4:
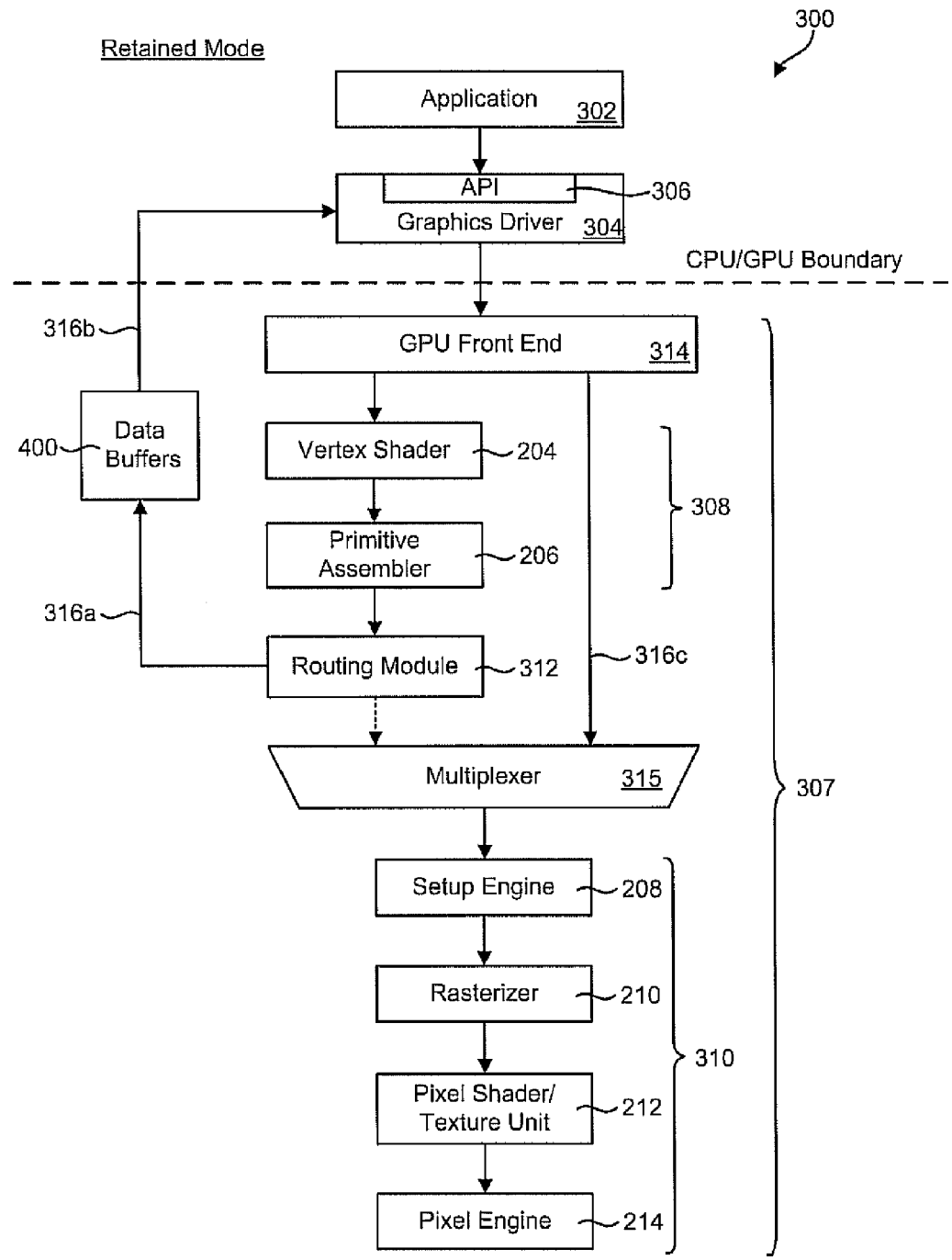
FIG. 4 is a flow chart showing the interaction between an application, graphics driver, and modified graphics pipeline in accordance with the invention, when operating in retained mode.

Referring to FIG. 4, when operating in retained mode, the routing module 312 may route primitives received from the geometry pass 308 for storage in one or more data buffers 400, instead of immediately sending the primitives to the rendering pass 310. Examples of the content and format of these data buffers 400 will be described in additional detail in association with FIGS. 6 through 8. Once the primitives for a scene are stored in these buffers 400, the graphics driver 304 may manipulate, sort, or perform operations on the primitives and other data to optimize the rendering process and conserve system bandwidth. These optimizations, sorting, and operations will be discussed in additional detail in association with FIG. 9.

Once the graphics driver 304 has manipulated, sorted, or performed operations on the primitives and other data in the data buffers 400, the graphics driver 304 may pass the primitives to the GPU front end 314. Because these primitives have already been processed by the geometry pass 308, the GPU front end 314 may be configured to send the primitives directly to the multiplexer 315 and the rendering pass 310. Thus, an additional pipe 316c, or direct data path 316c, may be provided between the GPU front end 314 and the rendering pass 310.

Because, the immediate and retained modes of operation may be implemented exclusively by the graphics driver 304 and the GPU pipeline 307, switching between the two modes of operation may be transparent to the application 302. Thus, a common API 306 may be provided to take advantage of both modes. This will also reduce system bandwidth and optimize system resources in a way that is transparent to the application 302.

Figure 5:
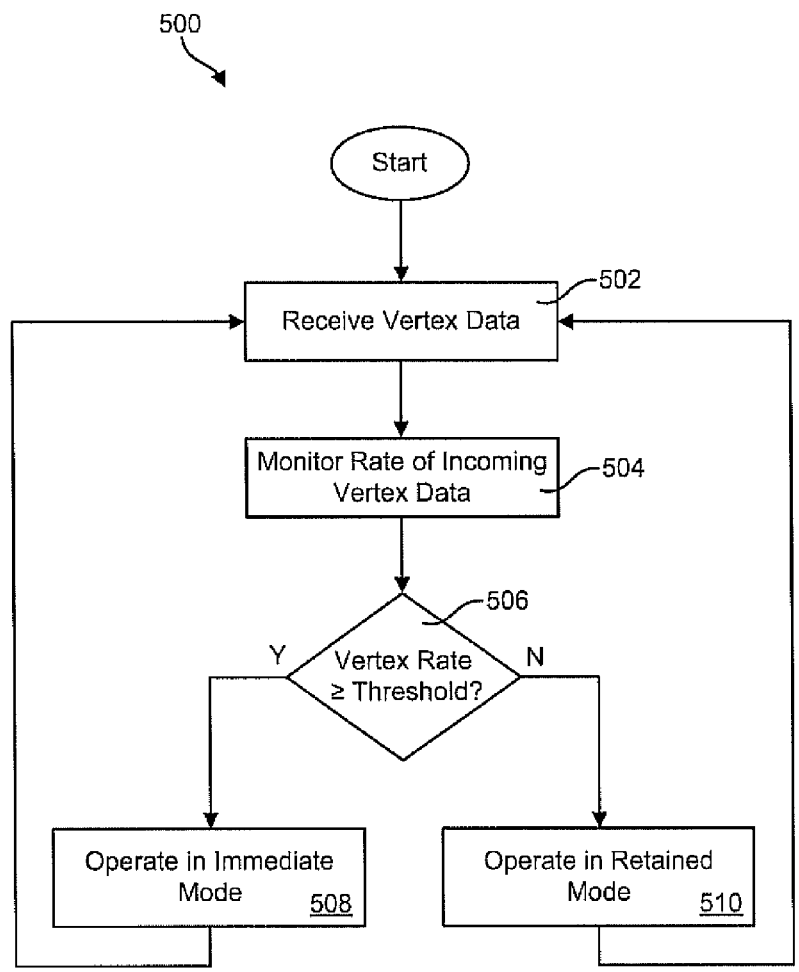
FIG. 5 is a flow chart showing one example of a method for switching between immediate mode and retained mode.

Referring to FIG. 5, in selected examples, a method 500 may be implemented to dynamically switch between immediate and retained modes of operation. In certain examples, this method 500 may be implemented by the graphics driver 304, as will be explained in association with FIG. 9. In selected examples, a method 500 may include receiving 502 vertex data from an application or other source of graphical data. The rate (or speed) of the incoming vertex data may be monitored 504 as it is received. In certain examples, the rate may be calculated based on the number of vertices that are received over a specified period of time, the number of vertices that are received for a scene or frame, or using other criteria.

This rate may then be compared 506 to a threshold value. If the rate is greater than the threshold value, the graphics system may be configured to operate 508 in immediate mode. This step 508 may include switching the graphics system to immediate mode (if not previously in immediate mode) or keeping the graphics system in immediate mode. Similarly, if the rate is less than the threshold value, the graphics system may be configured to operate 510 in retained mode. This step 510 may include switching the graphics system to retained mode (if not previously in retained mode) or keeping the graphics system in retained mode. Switching between modes may occur on-the-fly such as on a frame-by-frame basis.

The threshold value used in the comparison step 506 may be calculated based on the speed or resources available on the GPU (e.g., size of on-chip memory, etc.), the size of the frame buffer, or the like. For example, the larger the on-board memory on the GPU, the larger vertex rate the GPU may be able to handle before switching from retained mode to immediate mode.

In general, the graphics system illustrated in FIGS. 3 and 4 may be configured to operate in retained mode, for low vertex rates (i.e., below a selected threshold) and immediate mode, for high vertex rates (i.e., above a selected threshold). At low vertex rates (retained mode), all or a significant portion of the vertex and primitive data for a scene may be saved and sorted prior to being rendered. These primitives may then be rendered to small subdivisions, or "windows," of a display using on-board memory local to the GPU. Once a window is completely rendered using the on-board memory, the pixels for the window may be written to the frame buffer in external memory. Such window-based rendering significantly reduces graphics system bandwidth by reducing the number of times the GPU needs to read and write to external memory.

At higher vertex rates (immediate mode), all or a significant portion of the vertex and primitive data may be transmitted through the pipeline 307 in a single pass without storing or sorting the primitives prior to rendering. Because time and resources are needed to store primitives when operating in retained mode, retained mode may be unsuitable in situations or with applications where vertex rates exceed a selected threshold. That is, retained mode may be unable to support (e.g., keep up with) triangle rates above a certain threshold without impairing performance. Although immediate mode operation may consume significantly more system bandwidth than retained mode operation, the ability to switch between the two modes dynamically may be used to ensure that immediate mode is used only when vertex rates go up, such as when playing 3D games or using complex 3D applications. When vertex rates go down, which may occur most of the time depending on the way the computing device 100 is used, the graphics system may switch to retained mode to reduce system bandwidth and power consumption.

Figures 6, 7, 8:
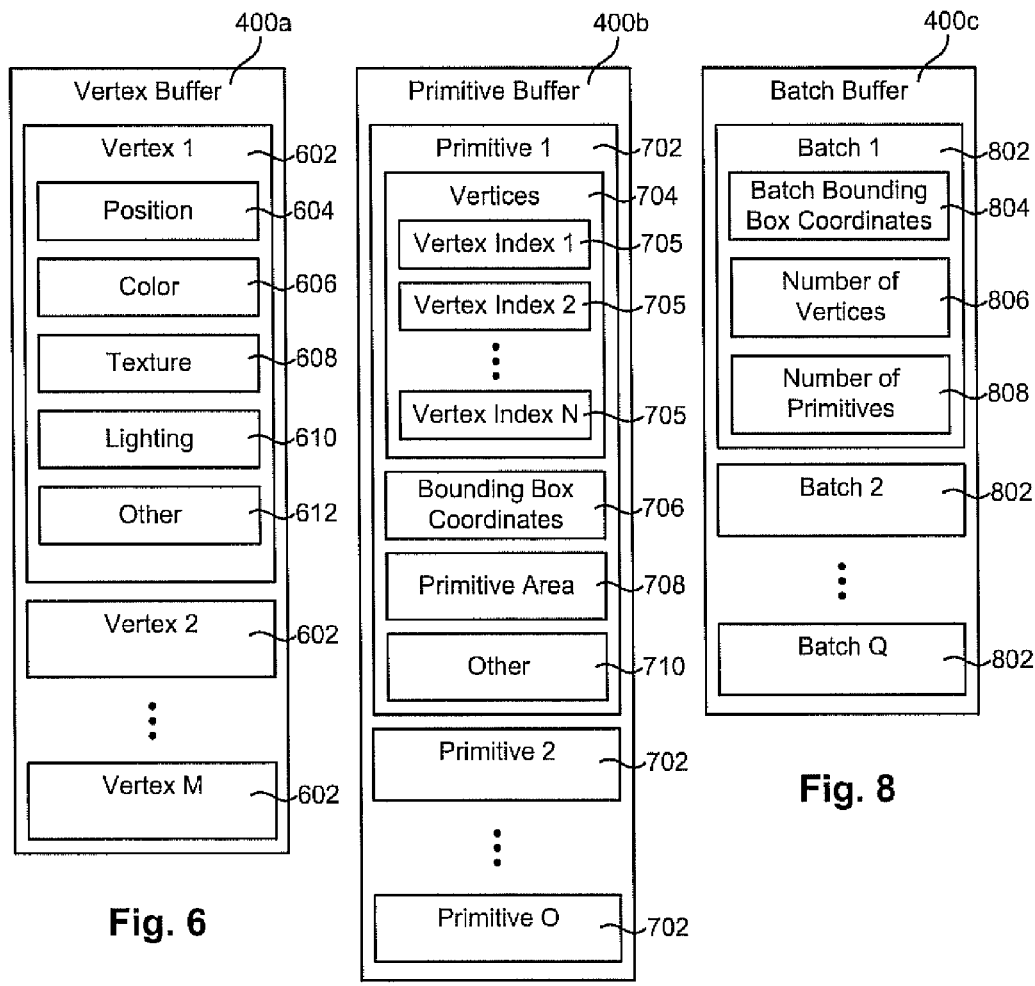
FIG. 6 is a high-level block diagram showing one example of a buffer for storing vertex data.
FIG. 7 is a high-level block diagram showing one example of a buffer for storing primitive data.
FIG. 8 is a high-level block diagram showing one example of a buffer for storing batch data.

Referring to FIGS. 6 through 8, in selected examples, the data buffers 400 described in association with FIGS. 3 and 4 may include a vertex buffer 400a, a primitive buffer 400b, and a batch buffer 400c. A vertex buffer 400a may be used to store each vertex 602 for a scene, which may include attributes such as the position 604 (e.g., coordinates), color 606, texture 608, lighting 610, and other data 612 associated with the vertex. A primitive buffer 400b may be used to store each primitive 702 (e.g., triangle, line) output by the primitive assembler 206. This may include storing the vertices 704 associated with each primitive 702. In certain examples, the primitive buffer 400b may store vertex indices 705 identifying the vertices 602, as opposed to storing the vertices 602 themselves, to avoid duplicating vertex data in the primitive buffer 400b.

In selected examples, a bounding box 706 may be calculated for each primitive 702 passing through the geometry pass 308. This bounding box 706 may be stored with the primitive in the primitive buffer 400b. In certain examples, a left coordinate, a top coordinate, a right coordinate, and a bottom coordinate may be used to identify the bounding box of a primitive 702. The graphics driver 304 may use the bounding box to determine if a primitive overlaps with a subdivision, or window, as will be shown in FIGS. 10 and 11. In selected examples, the primitive buffer 400b may also store the area 708 of each primitive. The setup engine 208 may use the area to perform interpolation computations. Similarly, the primitive buffer 400b may store other data or attributes 710 as needed.

In selected examples in accordance with the invention, the data buffers 400 may also include a batch buffer 400c. The batch buffer 400c may store information about batches 802 of primitives that belong to the same object or have the same render state (e.g., same texture). As will be described in more detail hereafter, this batch information may be used to optimize window size and placement to encompass entire batches of primitives, thereby allowing a batch 802 of primitives to be rendered together in a single pass. In selected examples, the batch buffer 400c may store a batch bounding box 804 for the entire batch, the number 806 of vertices in the batch 802, and the number 808 of primitives in the batch 802.

The data buffers 400a-c described in FIGS. 6 through 8 simply provide one method for storing data without being limited to the illustrated approach. Indeed, different methods, groupings, and formats may be used to store data needed for retained mode operation. Thus, the buffers 400a-c illustrated in FIGS. 6 through 8 may be modified to include fewer or additional buffers. Similarly, different types of data may be added or deleted from the buffers 400a-c, as needed.

Figure 9:
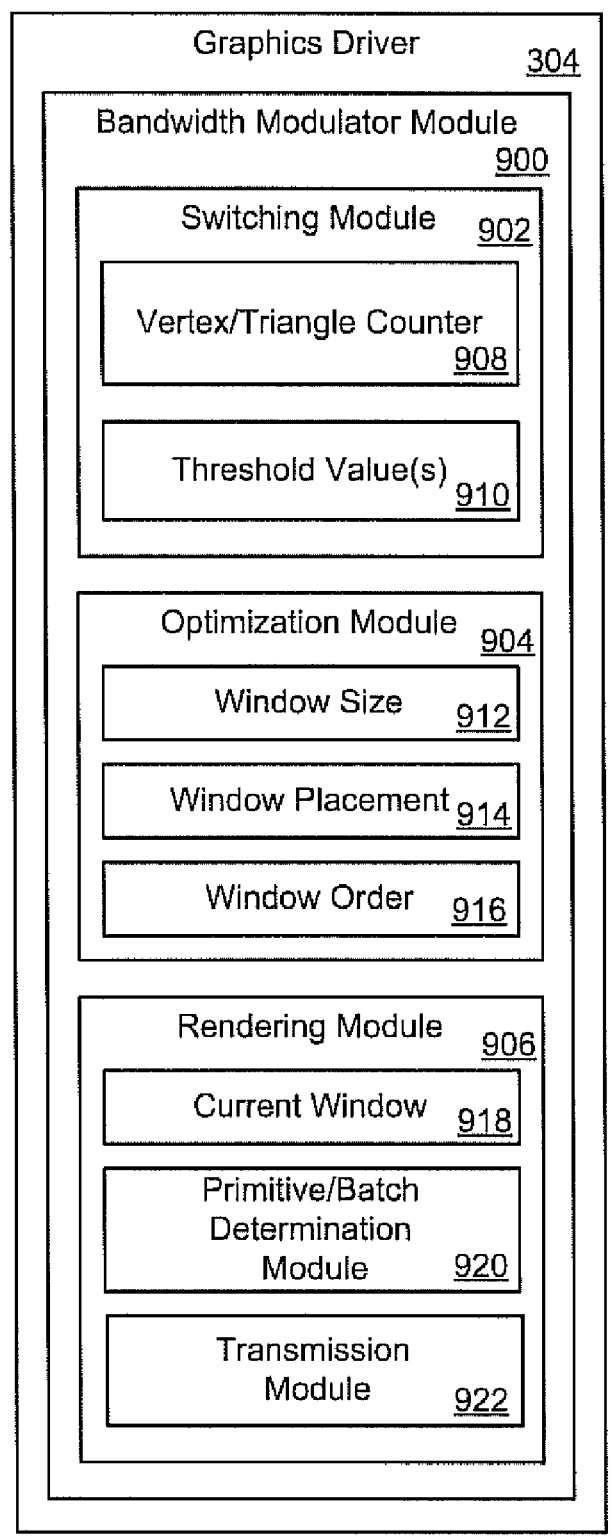
FIG. 9 is a high-level block diagram showing one example of a bandwidth modulator module in accordance with the invention.

Referring to FIG. 9, in selected examples, a graphics driver 304 in accordance with the invention may be configured to dynamically switch between retained mode and immediate mode to reduce system bandwidth and conserve power. In selected examples, a graphics driver 304 may include a bandwidth modulator module 900 to perform the above-stated functions. In certain examples, the bandwidth modulator module 900 may include a switching module 902, an optimization module 904, and a rendering module 906.

A switching module 902 may be configured monitor an incoming vertex (or triangle) rate using a vertex/triangle counter 908 or other monitoring module 908. As mentioned previously, this may be accomplished by monitoring the number of vertices that are received over a specified period of time, the number of vertices that are received for a scene being processed, or using other criteria. The switching module 902 may then compare the rate to a threshold value 910. If the rate is greater than the threshold value 910, the switching module 902 may switch the graphics system to immediate mode or continue operating in immediate mode. If the rate is less than the threshold value 910, the switching module 902 may switch the graphics system to retained mode or continue operating in retained mode.

An optimization module 904 may be configured to optimize the subdivisions, or "windows," used to render primitives using the GPU's on-board memory. For example, the optimization module 904 may optimize window size 912, window placement 914, or the order 916 that windows are rendered to efficiently utilize system resources. For example, window size 912 and placement 914 may be used to render an entire batch of primitives (e.g., primitives associated with the same object or render state) in a single window, allowing the primitives to be rendered together in a single rendering pass. In other cases, the windows may be enlarged to take advantage of larger on-board memory on the GPU 108. In other cases, the windows may be rendered in a specified order 916 such that more significant or important objects or primitives are rendered prior to other objects or primitives. In yet other cases, the windows may be sized and positioned to minimize the number of primitives that overlap multiple windows, reducing the number of primitives that are rendered multiple times. In certain examples, the optimization module 904 may be configured to dynamically perform these optimizations on-the-fly when in retained mode.

Because the primitives may be stored in a single buffer 400b, rather than being sorted and stored in separate buffers which are associated with different windows of fixed size and position, the optimization module 904 may be very flexible in the way it sizes and positions windows. Once the windows are optimized, primitives overlapping each window may be retrieved from the primitive buffer 400b and transmitted to the rendering pass 310 in the designated order 916.

A rendering module 906 may be provided to render the primitives once the window size 912, placement 914, and order 916 has been determined. For example, the rendering module 906 may determine the current window 918 (the window currently being rendered). A primitive/batch determination module 920 may then determine which primitives or batches of primitives overlap or are contained within the current window 918, such as by evaluating the overlap between the primitive and batch bounding boxes 706, 804 and the current window 918. A transmission module 922 may then send the primitives/batches that overlap with the current window 918 to the rendering pass 310 by way of the pipe 316c.

Although the modules described in FIG. 9 are shown as software modules included within the graphics driver 304, in other examples one or more of the modules 900, 902, 904, 906 may be implemented outside the graphics driver 304, such as within the GPU or within a separate application. Similarly, in other examples the modules 900, 902, 904, 906 may be implemented in software, hardware, firmware, or combinations thereof. Thus, any hardware, software, firmware, or the like which provides the stated function of the modules 900, 902, 904, 906, regardless of the module's location or method of implementation, is intended to fall within the scope of the invention.

Figure 10:
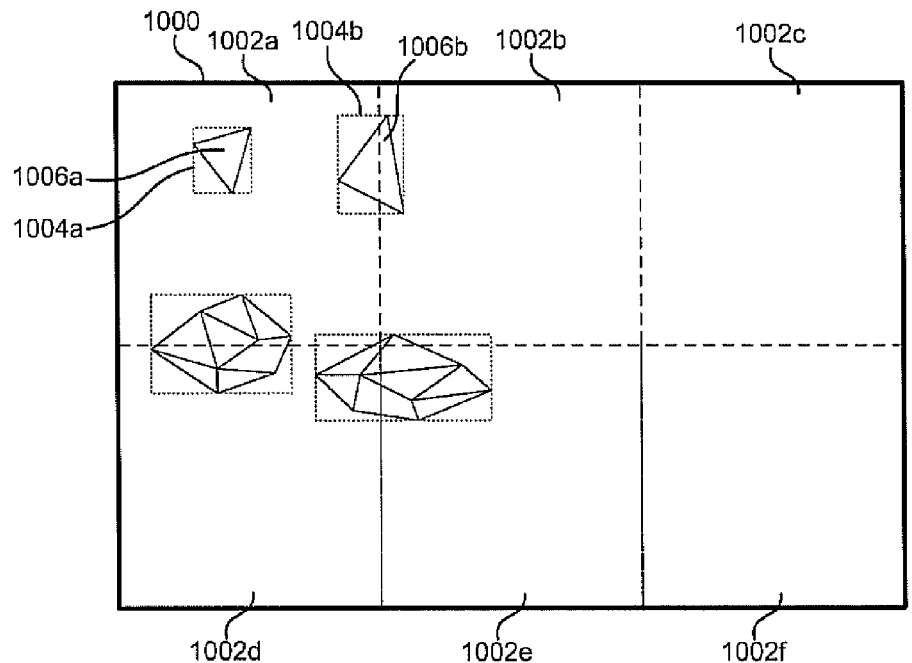
FIG. 10, is a high-level block diagram showing one example of a method for subdividing a screen.

Referring to FIG. 10, as mentioned, a screen 1000 may be divided into subdivisions 1002a-f, or windows 1002a-f, which may then be rendered individually using on-chip memory 116 of the GPU 108. Once the dimensions and placement of the windows 1002a-f has been determined, primitives overlapping each window 1002a-f may be retrieved from the primitive buffer 400b and transmitted to the rendering pass 310. For example, a primitive 1006a having a bounding box 1004a and a primitive 1006b having a bounding box 1004b may overlap the window 1002a and thus be transmitted to the rendering pass 310, rendered using on-chip memory 116, and then resolved to the frame buffer 118 when rendering the window 1002a. Similarly, subsequent windows 1002b-f may be rendered sequentially in a designated order after rendering the first window 1002a.

Figure 11:
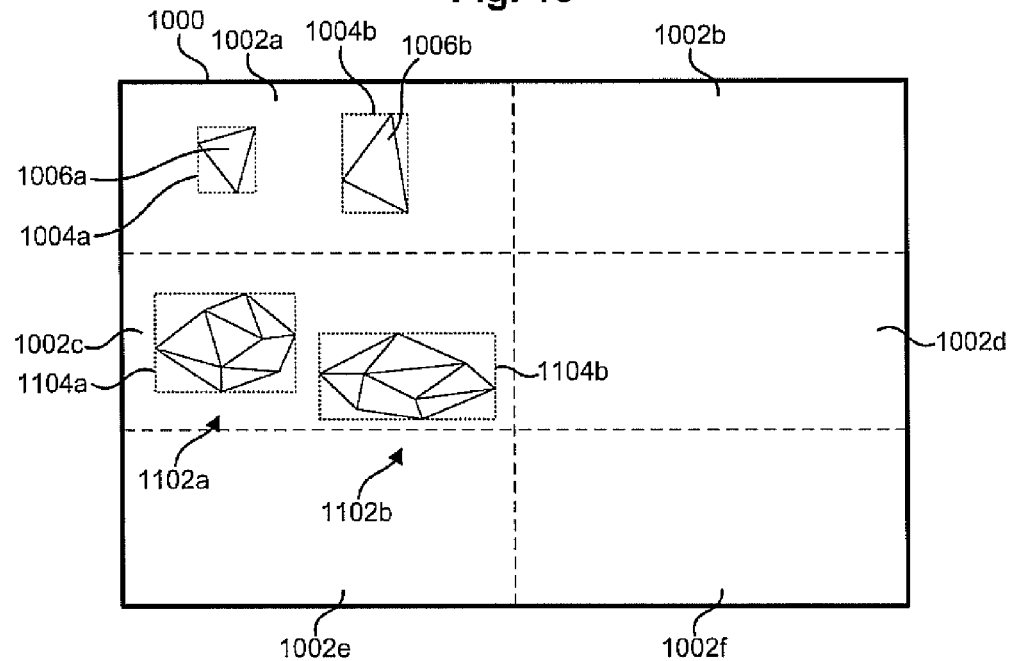
FIG. 11, is a high-level block diagram showing another example of a method for subdividing a screen.

Referring to FIG. 11, as mentioned, the optimization module 904 may, in certain examples, optimize window dimensions and placement to encompass selected primitives or entire batches of primitives, thereby allowing primitives or batches of primitives to be rendered in a single pass and in a single window. For example, the windows 1002a-f may be reorganized (e.g., resized, repositioned, etc.) to encompass primitives 1006a, 1006b or batches 1102a, 1102b of primitives that were formerly outside windows 1002a-f, partially overlapping windows 1002a-f, or divided across window boundaries. This may be accomplished by evaluating the primitive and batch bounding boxes 1004a, 1004b, 1104a, 1104b prior to determining window size and placement. In selected examples, the optimization module 904 may ensure that the windows 1002a-f utilize the same memory footprint (i.e., include the same number of pixels) in order to effectively utilize on-chip memory 116.

The present invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method to dynamically regulate system bandwidth in a graphics system, the method comprising:
   receiving vertex data from an application by way of an application programming interface;
   determining the rate at which vertex data is received from the application;
   operating in immediate mode, wherein vertex data is rendered substantially immediately upon reception, in the event the rate is greater than a selected threshold; and
   operating in retained mode, wherein vertex data is stored prior to being rendered, in the event the rate is less than the selected threshold.

2. The method of claim 1, wherein operating in retained mode further comprises assembling the vertex data to generate primitives and calculating a bounding box for each of the primitives.

3. The method of claim 2, further comprising storing the vertex data in a buffer.

4. The method of claim 2, further comprising storing the primitives and associated bounding boxes in a buffer.

5. The method of claim 4, further comprising calculating a batch bounding box for each batch of primitives having the same render state.

6. The method of claim 5, further comprising storing each batch and its associated bounding box in a buffer.

7. The method of claim 2, further comprising dividing a frame buffer into subdivisions, and determining which primitives are associated with each subdivision by calculating overlap of the bounding boxes with each subdivision.

8. The method of claim 7, further comprising rendering the primitives within each subdivision sequentially.

9. The method of claim 7, further comprising optimizing at least one of size and position of the subdivisions.

10. The method of claim 9, wherein optimizing further comprises at least one of sizing and positioning subdivisions to encompass batches.

11. A graphics system capable of dynamically regulating system bandwidth, the graphics system comprising:
 a graphics driver capable of receiving commands and vertex data from an application by way of an application programming interface; and
 a graphics processing unit (GPU) in communication with the graphics driver, the GPU and graphics driver together configured to operate in one of immediate mode, wherein vertex data is rendered substantially immediately upon being passed to the graphics driver, and retained mode, wherein vertex data is stored prior to being rendered; and
 a switching module to dynamically switch between the immediate mode and the retained mode in a manner that is transparent to the application, the switching module configured to switch between the immediate mode and the retained mode in accordance with the rate at which vertex data is received from the application.

12. The graphics system of claim 11, further comprising a data buffer to store the vertex data.

13. The graphics system of claim 11, wherein retained mode further comprises assembling the vertex data to generate primitives and calculating a bounding box for each of the primitives.

14. The graphics system of claim 13, further comprising a primitive buffer to store the primitives and their bounding boxes.

15. The graphics system of claim 13, wherein the retained mode further comprises calculating a batch bounding box for each batch of primitives that has the same render state.

16. The graphics system of claim 15, further comprising a batch buffer to store the batches and the batch bounding boxes.

17. The graphics system of claim 13, where the retained mode further comprises dividing a frame buffer into subdivisions, and determining which primitives are associated with each subdivision by calculating overlap of the bounding boxes with each subdivision.

18. The graphics system of claim 17, wherein the retained mode further comprises rendering each subdivision sequentially using on-chip memory local to the GPU.

19. The graphics system of claim 17, wherein the retained mode further comprises optimizing at least one of size and position of the subdivisions.

20. The graphics system of claim 19, wherein the retained mode further comprises optimizing at least one of size and position of the subdivisions to encompass at least one of a batch and a group of batches.

21. An apparatus to dynamically regulate system bandwidth in a graphics system, the apparatus comprising:
 means for receiving vertex data from an application by way of an application programming interface;
 means for determining the rate at which the vertex data is received from the application;
 means for operating in immediate mode, wherein vertex data is rendered substantially immediately upon reception, in the event the rate is greater than a selected threshold; and
 means for operating in retained mode, wherein vertex data is stored prior to being rendered, in the event the rate is less than the selected threshold.

22. The apparatus of claim 21, wherein means for operating in retained mode further comprises means for assembling the vertex data to generate primitives and means for calculating a bounding box for each of the primitives.

23. The apparatus of claim 22, further comprising means for dividing a frame buffer into subdivisions, and means for determining which primitives are associated with each subdivision by calculating overlap of the bounding boxes with each subdivision.

24. The apparatus of claim 23, further comprising means for rendering the primitives within each subdivision sequentially.

25. The apparatus of claim 24, further comprising means for optimizing at least one of size and position of the subdivisions.

* * * * *